(12) United States Patent
Tacchi

(10) Patent No.: US 6,648,236 B2
(45) Date of Patent: Nov. 18, 2003

(54) APPARATUS FOR HEAT STORAGE THROUGH A THERMOVECTOR LIQUID

(76) Inventor: Vittorio Tacchi, c/o Giancarlo Tacchi - Via Manin, 15I, 51015 Montecatini Terme (IT)

(*) Notice: Subject to any disclaimer, the term of this patent is extended or adjusted under 35 U.S.C. 154(b) by 0 days.

(21) Appl. No.: 10/232,501

(22) Filed: Aug. 30, 2002

(65) Prior Publication Data

US 2003/0042321 A1 Mar. 6, 2003

(30) Foreign Application Priority Data

| Apr. 9, 2001 | (IT) | PT2001A0010 |
| Jun. 26, 2002 | (IT) | PT2002A0015 |
| Jul. 24, 2002 | (IT) | PT2002A0015 |

(51) Int. Cl.[7] .............................................. F24H 3/00
(52) U.S. Cl. ...................................... 237/70; 126/110 B
(58) Field of Search .............................. 237/59, 75, 44, 237/70; 126/110 B

(56) References Cited

U.S. PATENT DOCUMENTS

| 228,616 A | * | 6/1880 | Dubois .................... 165/174 |
| 253,693 A | * | 2/1882 | Gold ......................... 237/71 |
| 348,523 A | * | 8/1886 | Hutchinson ................. 62/436 |
| 1,137,752 A | * | 5/1915 | Goldstein .................. 236/44 C |
| 1,342,214 A | * | 6/1920 | Hardie ....................... 237/56 |
| 2,316,191 A | * | 4/1943 | Scott ........................ 126/659 |
| 2,677,243 A | * | 5/1954 | Telkes ........................ 62/56 |
| 4,063,547 A | * | 12/1977 | Gruettner ................... 126/623 |
| 4,116,268 A | * | 9/1978 | Kruger ....................... 165/111 |
| 4,131,158 A | * | 12/1978 | Abhat et al. ............ 165/104.14 |

* cited by examiner

Primary Examiner—Derek Boles

(57) ABSTRACT

This invention relates to the field of heating water for consumption, preferably but not exclusively water heated by solar energy, and more specifically the invention refers to a heat storage device which is characterized substantially by a special and innovative arrangement and conformation of the storage tanks that the device is made up of, as well as of the pipes connecting the same.

The heat storage device according to the present finding comprises two or more superposed tanks (S) featuring a substantially horizontally developed geometrical shape and containing a liquid that is suitable to store heat, each one of said tanks being connected to the immediately adjacent tank/tanks through at least one end-pipe.

14 Claims, 4 Drawing Sheets

APPARATUS FOR HEAT STORAGE THROUGH A THERMOVECTOR LIQUID

The present invention relates to the field of consumption-water heating, and it preferably but not exclusively relates to water heated by means of solar energy, and more specifically the invention relates to a storage device which is characterized substantially by a special and innovative arrangement and conformation of the storage tanks that the device is made up of, as well as of the pipes that connect them.

It is well known that in the storage within a normal tank-boiler a temperature decrease occurs in water which is contained in its upper portion and transfers heat to the lower, colder layers because of conductivity of water and of the tank walls themselves, as well as because of the mixing occurring during the use of the plant and of "thermosiphon-like" circulation (convective motions). Such decrease in the temperature gives rise in time to a decrease in the amount of water that can be employed at a given temperature.

The total amount of heat, enthalpy, does not decrease, but the exploitation possibility, with reference to a determined temperature, decreases with increasing the entropy of the system.

The main object of this invention is that of limiting said reduction of temperature by proposing a new configuration and a new arrangement of the storage tanks and of the connecting pipes as relative.

This was attained, according to the present finding, substantially by providing the subdivision of a determined volume of hot water stored in two or more tanks of an equivalent total volume, and by connecting them through pipes arranged in a suitable way.

It is also known that the transformation of solar energy into heat can be obtained with a higher yield by solar panels of the "single-block" or "integrated" type when the part exposed to the sun is also the hot water storage tank.

A second object of the invention is that of attaining both the keeping of high temperatures of water for a longer time and a higher yield of transformation of solar energy into thermal energy for the heating of water itself, both directly and indirectly through the employment of a thermovector liquid.

A better understanding of this finding can be attained from the following detailed description and with reference to the enclosed figures that illustrate just for exemplification and not for limitation purposes some of the preferred embodiments of this invention.

In the drawings:

FIGS. 1 and 2, which refer to a first embodiment of the invention featuring automatic valves, show said finding respectively in the presence and in the absence of hot water consumption, in the latter case the circulation being of the thermosiphon kind because of convective motions;

FIG. 3 shows a second, automatic valve-free embodiment of the present finding, during the drawing of hot water;

FIGS. 4 and 5 refer respectively to a third embodiment of said finding, in which some further connection pipes are present that speed up the thermosiphon-like circulation and make it easier;

The storage apparatus according to the finding includes two or more superposed tanks S featuring substantially horizontally developed geometrical shapes and containing a liquid suitable to store heat, each one of said tanks being connected to that/those adjacent through at least one end-pipe.

In a first embodiment of this invention (FIG. 1) an apparatus is provided for storing water, said apparatus comprising three tanks S for performing the storage which are superposed and feature a substantially horizontally developed geometrical shape, and which are endowed with respective upper end-pipes 4 which connect the upper portion of each tank S with the upper portion of the adjacent tank, and with respective lower end-pipes 7 which connect the lower portion of each tank S with the lower portion of the adjacent tank.

Figure 1:
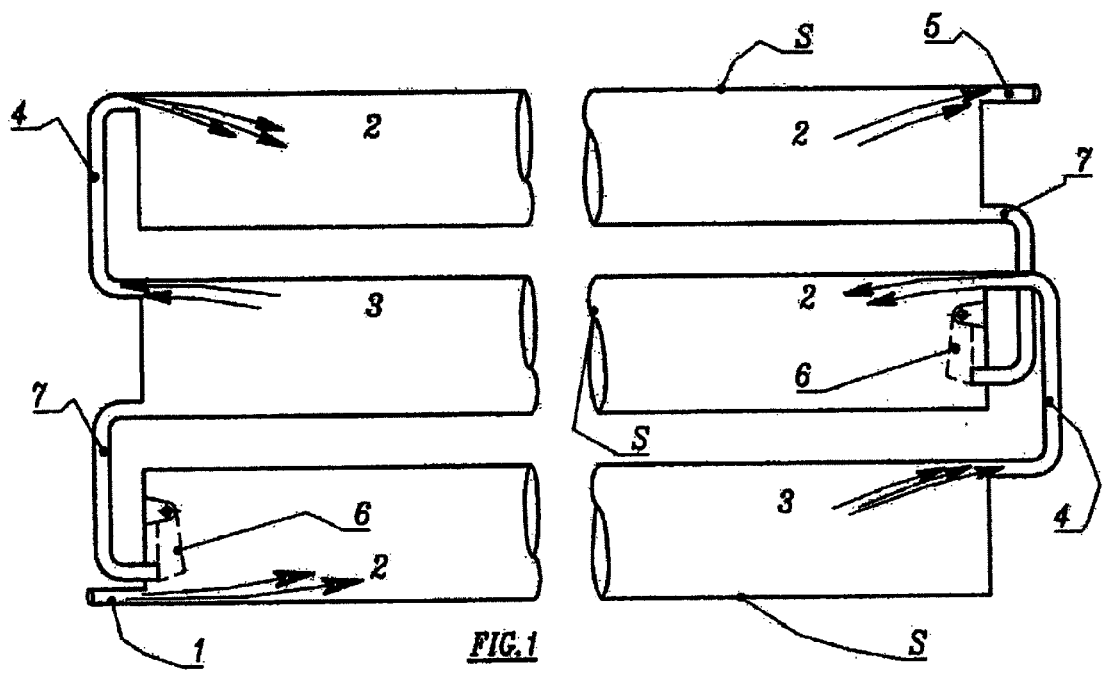

As can be seen in FIG. 1, the tank that is in the highest position has an outlet upper pipe 5 for hot water toward the users, while the tank in the lowest position has an inlet lower pipe 1 for cold water from the water main.

For the sake of better clarity, in the Figure mentioned above the sense of circulation of water during consumption has been pointed out by 2, while the sense of circulation of hotter water contained within a tank toward the upper adjacent tank has been pointed out by 3.

As will be seen more clearly in the following, in that first embodiment of the present finding also some automatic valves 6 are provided preferably, said valves getting closed during water consumption and getting open during the periods of no drawing of water.

Figure 2:
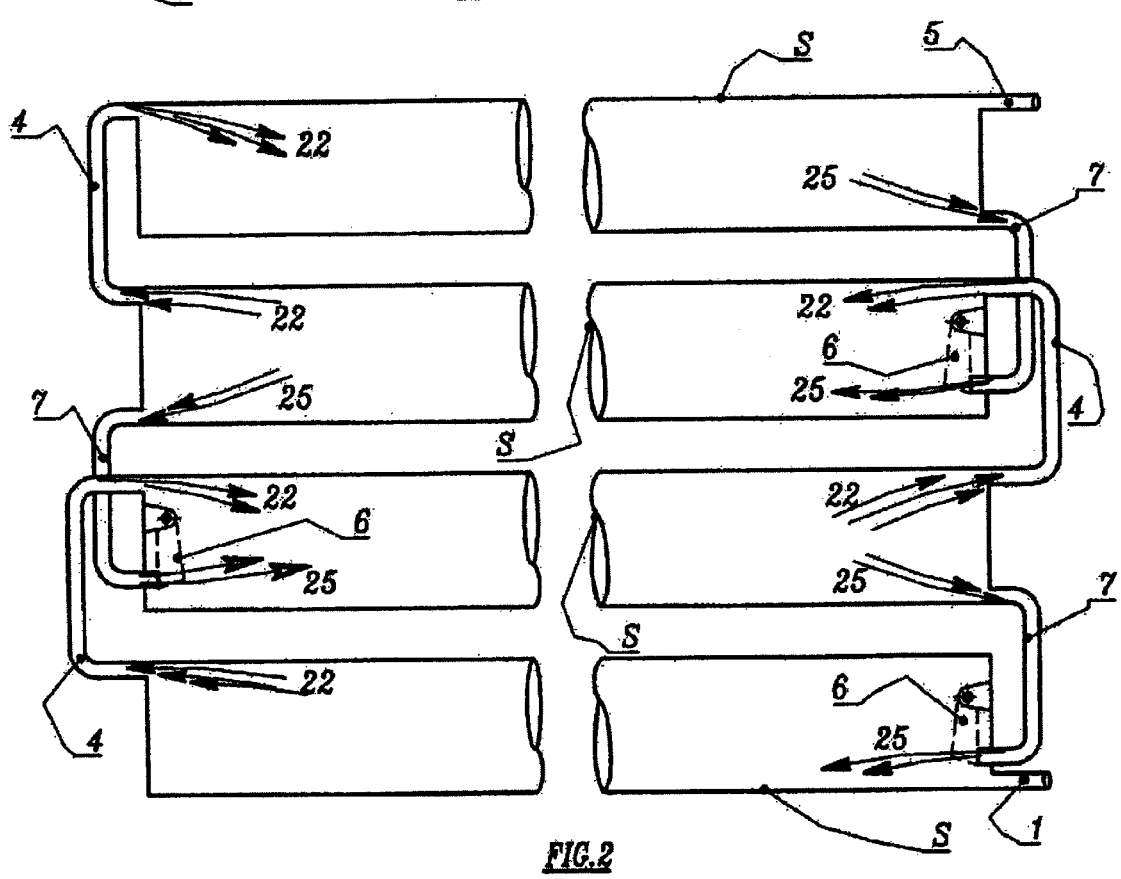

A variant of the embodiment just described herein above is shown in FIG. 2 in the no-use configuration, and four tanks S are provided in it.

It is interesting to observe, in that second Figure, the circulation motion of water between the tanks that is caused by the convective motions that give rise to a thermosiphon-like circulation: number 22 points out in general the sense of circulation of hotter water from each tank to the upper adjacent tank, said circulation occurring through the pipes 4 for the rising flow which are arranged at the ends of the tanks S, while number 25 points out in general the sense of circulation of colder water from each tank S toward the lower adjacent tank, said circulation occurring through the descent pipes 7, they too being arranged at the ends of tanks S.

In the case of traditional systems, in which one only tank is provided for storage of hot water, the natural degradation of temperature that has already been mentioned above asks for the presence of solar panels of larger surface area or of superior quality with respect to those required if the present invention is exploited, and hence with increased costs, in order to have at disposal a given volume of hot water at the desired temperature within a given time.

Advantageously, by dividing the water storage into two or more tanks which feature a horizontally developed shape according to this invention, temperature decreases more slowly and more hardly because there is no physical continuity between a tank and the other one, apart from the pipes that connect them.

Accordingly, it is evident that such a limited degradation of temperatures is of help in keeping the temperatures that can be exploited, so that even the already existing plants would profit from a configuration of the storage tank like that described herein, with an increased yield.

According to a special feature of the present finding, the novel arrangement of the multiple horizontal tanks favours also the storage of hotter water into the tank at the highest position, from which tank water is drawn for use, while temperature in tanks which are in the lowest positions is gradually decreasing.

According to the present invention, this is obtained through the thermosiphon-like circulation that, during the no consumption period, takes hotter water to the upper levels by means of a pipe arrangement that is suitable to avoid strong mixing between counter-opposed flows. Indeed, said mixing would give rise to vortices between the down-flowing colder water and the up-flowing hotter water that would decrease the high temperatures.

In a further special feature of the present finding, hot water circulation between the tanks S during consumption is so provided as to cause it to always flow from the hottest zone of each tank toward the tank at the immediately upper position, and so as no cold water flows up to the upper levels through the lower pipes of each tank that are necessary for thermosiphon-like circulation of colder water toward tanks in the lower positions. In the first embodiment of the present finding, and in its variant as well, which are shown in FIG. 1 and FIG. 2, this is obtained by arranging at the lower ends of each one of the lower end-pipes or descent pipes 7, already described, an automatic closure valve 6 controlled by pressure differences that arise between the tanks S during hot water consumption. Said pressure difference can be favoured and even increased by adopting, for pipes 4 that connect the upper portions of the adjacent tanks with each other, smaller cross-sections for the flow with respect to those of pipes 7 that connect the lower portions of the adjacent tanks S with each other.

Figure 3:
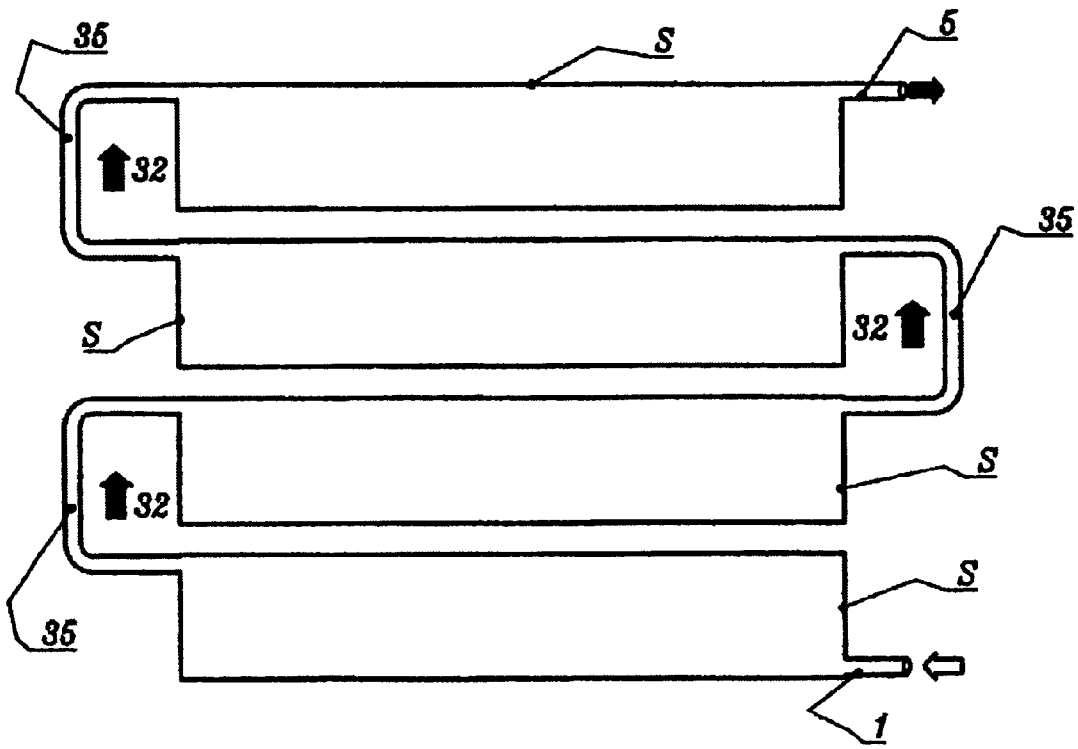

In a second embodiment of this invention, shown in FIG. 3 in the case of hot water circulation during consumption, a total volume of storage water is provided, which is divided among four tanks S featuring a predominantly horizontally developed geometrical shape, and which is free from automatic closure valves. For better clarity, in said Figure the inlet for not heated water from the water main is pointed out by 1; number 32 points out the sense of circulation of water of tanks S during the period of drawing water from the outlet pipe 5 toward the users. In particular, the adjacent tanks S are connected with each other by means of pipes 35, through which pipes the hotter water flows up from the lower tanks toward the users.

In that case, circulation of water occurs as follows: once all tanks S have become filled with water at the temperature of the water main, it is necessary to wait some time for the heating of water up to the temperature of its use, during which hotter water goes through convection into the upper portion of each tank. When the consumption of hot water is started, by drawing it out of the end-pipe 5 at the high portion of the upper tank, water flowing out of said tank is substituted with hot water which is in the upper portion of the tank which is arranged immediately below, and the same happens with each one of the underlying tanks, the last one of which (the lower tank) receiving inlet water directly from the water main. After a number of hot water-drawing operations or after some use of hot water and some heating operations, the upper tank becomes saturated with water at the exploitation temperature, while the underlying tanks contain water at average temperatures of gradually decreasing values.

From FIG. 3 it is clear that in this instance no thermosiphon-like circulation of hotter water toward tanks in the upper positions and of colder water toward tanks in the lower positions is set forth, but in any case hotter water in tanks at upper positions is prevented from heating water contained in the lower tanks. Moreover, also the formation of vortices and the mixing of hot water with cold water are eliminated.

This simplified solution, without thermosiphon-like circulation between tanks, is particularly economical and it can be convenient especially in case hot water consumption operations of short duration and of small amount are provided, as quite often occurs.

On the contrary, if consumptions of water not frequent but of quite long duration and quite large amounts are provided, it is preferable to adopt a solution of the type described herein below.

Figure 4:
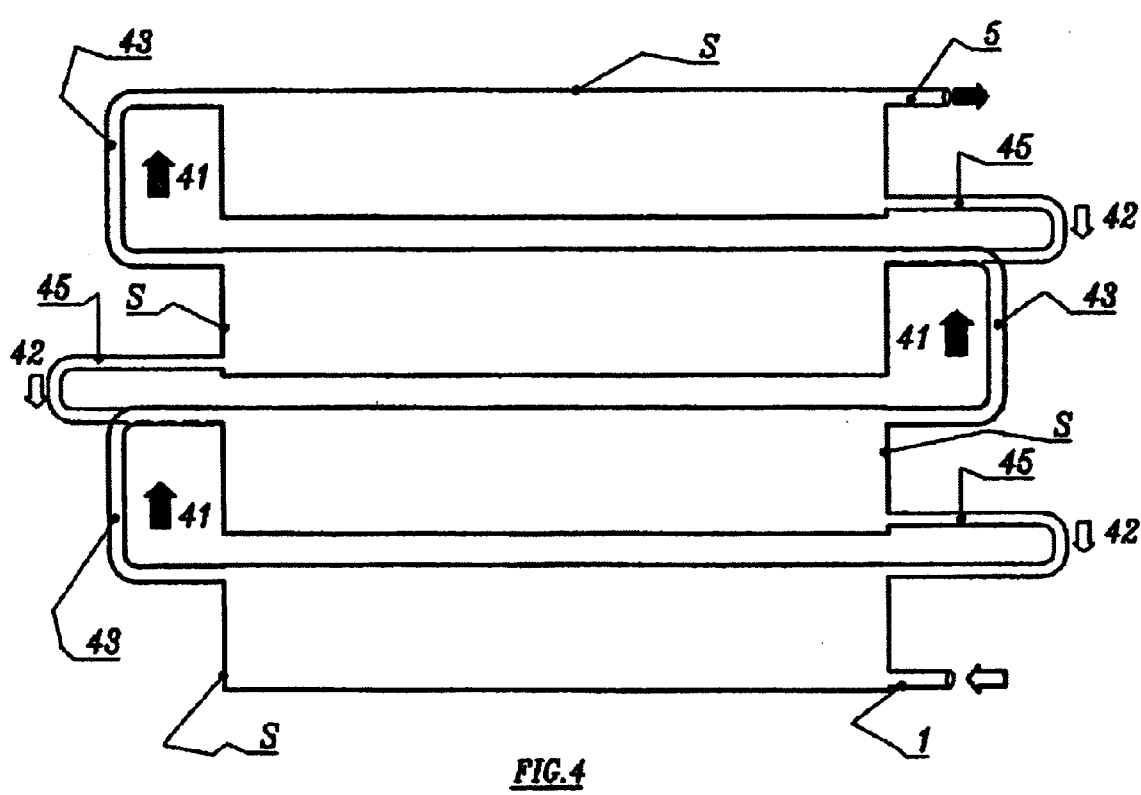
Figure 5:
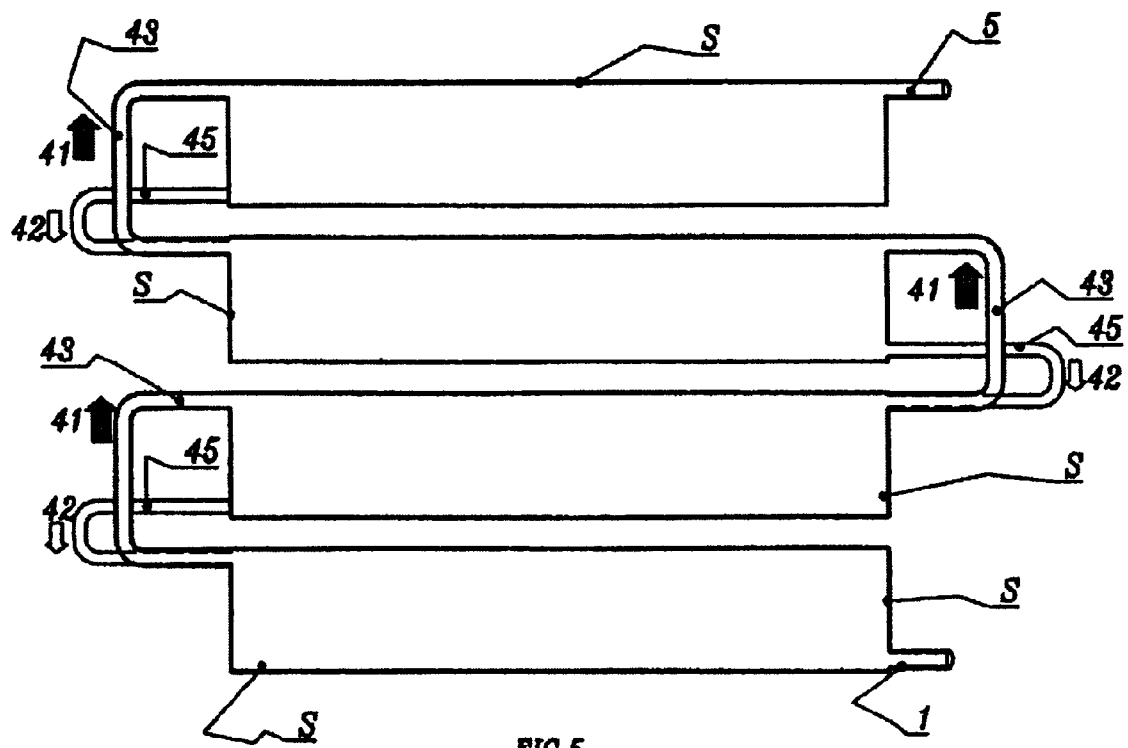

In FIGS. 4 and 5, which refer to a third embodiment of the present invention, and to a variant of it as well, a plurality of tanks S is provided, each one of them being connected to the adjacent tank through two pipes 43 and 45 that are suitable to allow a thermosiphon-like circulation to occur. Advantageously, in such cases the upper tank is completely filled with water at the exploitation temperature, within a shorter time with respect to the preceding case and without any need for water drawings and without the presence of automatic closure/opening valves.

More specifically, said FIGS. 4 and 5 show schematically the thermosiphon-like circulation, in the absence of hot water consumption, with a total volume of storage water divided among four tanks S which feature a predominantly horizontally developed geometrical shape, where the black arrows 41 refer to the circulation of hotter water upward through the first pipes 43 while the white arrows 42 refer to the circulation of colder water downward through the second pipes 45.

It is useful to observe that while the hot water flow direction inside the first pipes 43 for the rising flow is always in the same sense both during the thermosiphon-like circulation and during the periods when water is drawn from the plant, the water flow direction inside the second pipes 45 occurs downwards (colder water) during the thermosiphon-like circulation, and upwards (hotter water) during the period of water consumption.

Similarly to what has been told about the preceding cases, the subdivision of the water storage volume among a number of adjacent tanks which are superposed and connected to one another by means of suitable pipes allows the water temperature decrease to be strongly limited while simultaneously keeping the temperature of water contained within the tank in the highest position, from which the hot water is drawn, at the maximum possible temperature even after the water drawing operations.

All that has been attained according to the present invention by adopting a particular arrangement for the pipe sites, which is illustrated in FIGS. 4 and 5, in which it is found that during hot water consumption the circulation of hotter water from a tank toward the tank at the immediately upper position occurs through the first and the second pipes 43 and 45, the second one of said pipes being preferably of a diameter lower than the other pipe, and by means of which pipes the upper tanks are fed.

The arrangement mentioned above of the connection pipes 43 and 45 between the ends of the tanks S is as follows: the upper zone of each tank is connected to the upper zone of the tank which is placed immediately above it by means of the first pipe 43, which features a larger cross-section; moreover, the upper zone of each tank is also connected to the lower zone of the tank at the immediately upper position through the second pipe 45 featuring a smaller cross-section.

In the embodiment illustrated in FIG. 4, the larger cross-section pipe and the smaller cross-section pipe 43 and 45 respectively are arranged at the same end of the tank from which they depart, while in the variant shown in FIG. 5 said pipes are placed at opposite ends.

In the same figures it can be seen that in the absence of hot water consumption a thermosiphon-like circulation sets in. Thus, hotter water flows upwards out of the pipes 43 having larger cross-sections and, which connect the upper zones of each tank, while colder water flows downwards out of the pipes 45 having smaller cross-sections and which connect the lower zone of the upper tank to the upper zone of the lower tank.

In a different way, when there is consumption of hot water, hotter water flows upwards through both the first and the second pipes 43 and 45 out of each tank into the tank immediately above.

Figure 6:
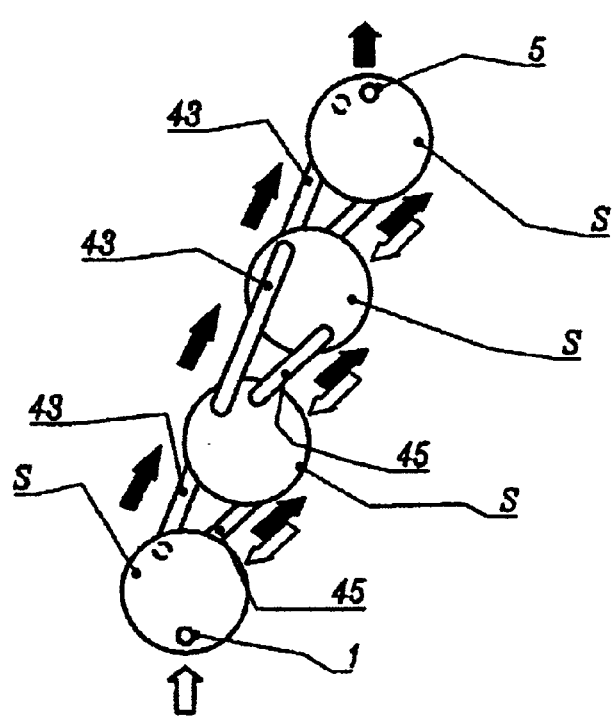
FIG. 6 is a side view of FIG. 5.

Observing again FIGS. 4 and 5, it can be noticed that, with respect to the preceding cases in which automatic valves were present, this configuration of the apparatus according to the present invention is characterized by a stronger turbulence and mixing between hot an cold water. But as a contraposition to that, it must be observed that the absence of said automatic closure valves simplifies the structure of the apparatus and makes the adoption of such simplified configurations convenient in many cases. In FIG. 6 a side view of the solution according to FIG. 5 is shown, where the larger cross-section pipes 43 and the smaller cross-section pipes 45 depart as much separately as possible from an end of each tank S, always from the upper zone of the underlying tank, respectively toward the upper zone and the lower zone of the tank placed above. This separation has a tendency to ensure a decreased extent of mixing.

From what has been told up to now, according to the present invention the following is provided:

A. hot water for consumption is drawn (the drawing operation) exclusively and sequentially always from the upper zone of each tank S, with unidirectional flow throughout the larger size of the single tanks, as is evident from the figures;

B. in the absence of water drawing for consumption, a thermosiphon-like circulation sets in between the tanks S, said circulation occurring fully or partly with motions similar to those that occur during the water drawing operations;

C. as the thermosiphon-like circulation occurs by displacing equal volumes of hotter water and of colder water, if the cross-sections at the points where the pipes are connected to the tanks are equal the flow-rates of the two streams are the same and thus any turbulence and mixing are further reduced;

D. hot water storage occurs within two or more tanks which are superposed and physically separated just through suitable pipes, so as to strongly reduce the temperature decrease that is determined by heat transfer between the tanks;

E. water from the water main is introduced into the lower zone of the tank which is in the lowest position, while heated water is drawn out of the upper zone of the tank which is placed in the highest position; moreover, colder water of each tank cannot flow upwards into the tank above it during water consumption, but just hotter water of each tank flows upwards.

As a result of the features of the present findings that have been described above, a set of advantages is obtained among which the following are mentioned:

the "layering" of hot water in two or more superposed tanks featuring a predominantly horizontally developed geometrical shape allows the average temperature of each tank to be kept constant, without any decrease due to conductivity toward tanks containing colder water;

during consumption of hot water, the hotter water within each tank is always drawn during the absence of consumption, a thermosiphon-like circulation between each tank and the adjacent tank can set in, so that hotter water is surely stored within the tanks at the higher positions while colder water collects within the tanks in the lower positions, all that occurring without excessive production of vortices and thus without heat transfer as a result of mass transfer.

According to the present invention, such advantages are obtained just as a result of the particular arrangement and conformation of the tanks and to the innovative pipe system that connects them.

Figure 7:
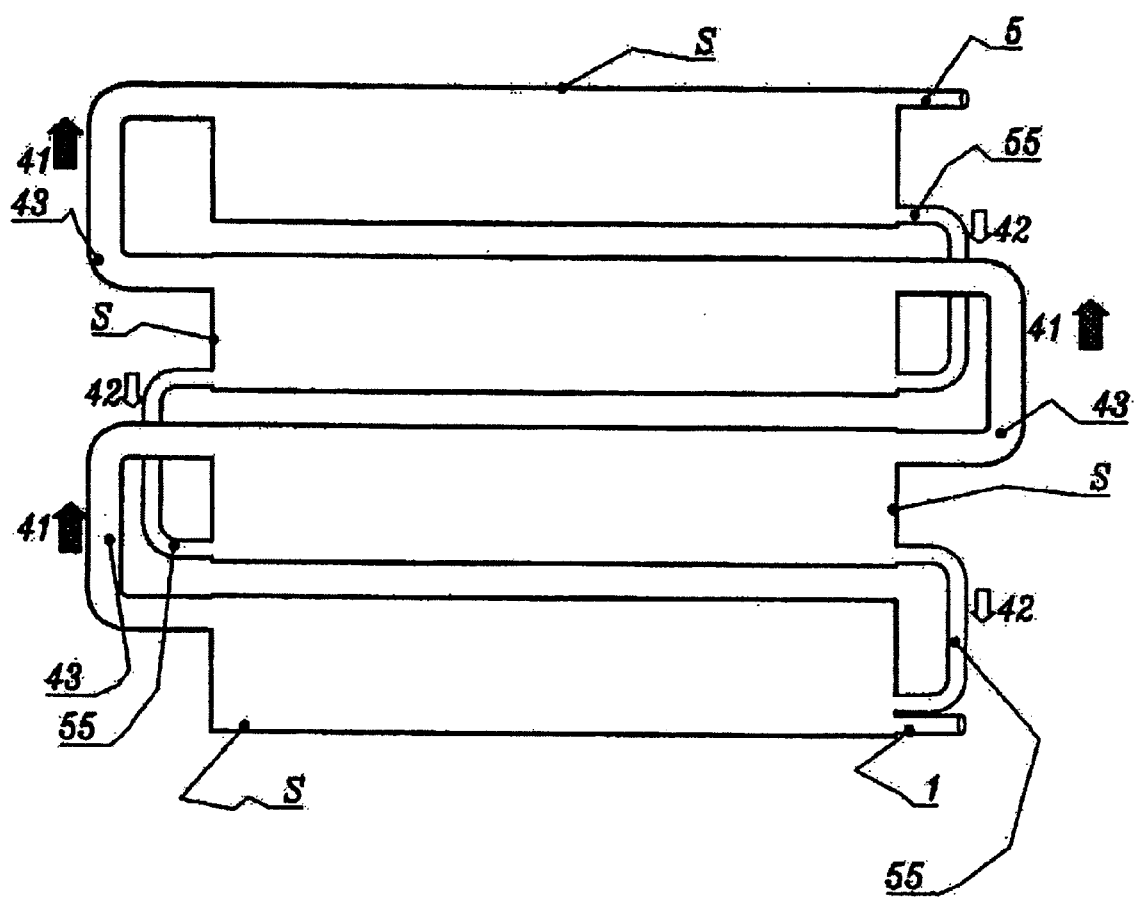
FIG. 7 shows a fourth embodiment of this finding, which is suitable to reduce in a remarkable way the presence of vortices both during the drawing of hot water and during the thermosiphon-like circulation in the absence of water consumption.

In a fourth embodiment of the present finding, which is shown in FIG. 7, a particular conformation is provided for the connection pipes between each tank and the immediately adjacent tank, with the object of ensuring in addition to the advantages already listed above also the advantage of an almost full absence of vortices and mixing, both during hot water consumption and during the thermosiphon-like circulation when in the absence of water consumption.

According to the invention, this has been obtained as a result of the large difference in cross-sections between the two pipes 43 and 45 that connect each tank S with the adjacent tank.

Indeed, in that case said pipes 43 and 45 connect respectively the upper zone of each tank with the upper zone of the tank which is immediately above the same, and the lower zone of the latter with the lower zone of the immediately underlying tank. In the specific case, the pipes 43 that connect the upper zones of the adjacent tanks S feature a strongly larger cross-section than the cross-section of the pipes 55 that connect the underlying zones of said tanks. This particular solution makes the circulation of water toward the upper tanks possible, during hot water consumption, with no pressure differences between the tanks, so that colder water is not drawn back upwards through the pipe 55 featuring a smaller cross-section; all that occurs also as a result of the difference in the specific weights between colder water that is contained in the lower zone of the underlying tank and water contained in the tank immediately above the same. According to the finding, it is preferable that the cross-section of the water inlet pipe 1 for water from the water main into the lowest tank and the cross-section of the water outlet pipe 5 for hot water out of the tank placed in the highest position are slightly larger than the cross-sections of the pipes 55 that connect the lower zones of tanks S.

Moreover, it is also preferable that the cross-section of the pipe 43 which connects the upper zones S be much larger even than the cross-sections of the pipes 1 and 5 mentioned above respectively for the inlet of water from the water main and for the outlet of hot water.

It is also to be observed that, in the absence of solar radiation, when after a given time the temperatures in each single tank have become equal, even though during water consumption a reduced amount of water (due to the smaller cross-section) flows up toward the upper tank, this is of no negative consequence, because possibly water at the same temperature would rise up through the two pipes 43 and 55 and said water on arriving at the upper tank would flow into the same up to the corresponding level.

From FIG. 7 it is clearly seen that the thermosiphon-like circulation always occurs in the same direction (cold water 42 flows down through the pipes 55 of smaller cross-sections) so ensuring an almost absolute absence of vortices and mixing, also as a result of arranging the pipes 43 and 55, which connect two adjacent tanks, at opposite ends of the same tanks.

Finally, in case of a horizontal arrangement of a number of tanks that in turn act as solar collectors, it is also possible to provide a door (not shown) that is open or closed according to the presence or the absence of solar light. This door, which can be opened or closed also manually or automatically, is for the purpose of making it easier to keep at night the temperatures reached by each one of the tanks arranged horizontally and grouped into each set or single collector, and to that end it is preferably built with an insulating material and acts synergically with the insulation provided for tanks.

Said door is preferably supplied in its inner part with a reflecting surface that, during the daily period, reflects solar light so increasing its yield. The automatic control of said door can be performed, for instance, through a photocell that actuates a motor that opens and closes said door mechanically.

As an alternative, the opening/closing control of said door can be supplied by means which, due to solar energy heating, undergo dilation, or by containers of low-boiling liquids which give rise to pressures suitable for actuating the opening and the closing of the door itself.

A further application of the storage apparatuses described up to now consists in placing them on a common solar panel, just like an ordinary boiler which now would be a multi-volume one and would keep the advantages mentioned above. Similarly, the present invention can be exploited for storing water that has been heated by means of other heat sources.

Finally, it is also interesting to observe that, according to the present invention, it is also possible to provide an apparatus for heat storage in which the tanks S contain a mixture of water with antifreeze compounds and compounds against corrosion of metal parts, which mixture acts as a heat storage for delayed use of hot water, and in which the tank in the highest position is supplied with a heat exchanger of suitable size, in which water from the water main circulates for being heated before being employed as hot water by users.

This further configuration of this invention (not shown) has the advantages that the thermosiphon-like circulation is not stopped during hot water consumption, so that the presence of a liquid mixture at the maximum possible temperature within the upper tank always is warranted, and that there is no problem of frozen water and of metal part corrosion.

However, such a solution asks preferably for an increase in the temperature of the mixture that circulates inside the tanks S, in order to cause such a temperature jump with respect to consumption water as to be sufficient to warrant a suitable heat exchange between said mixture and water to be heated which flows across the heat exchanger into the tank placed in the highest position. Said temperature increase of the liquid contained within the tanks S can be of about 5–6° C. with respect to the preceding solutions.

The point is hardly worth observing that, excluding the antifreeze and anticorrosion properties, the advantages just described are obtained even by employing merely water instead of said mixture.

What is claimed is:

1. Apparatus for storing heat, said apparatus being characterized in that it comprises two or more superposed tanks (S) featuring a substantially horizontally developed geometric shape and containing water or a liquid suitable to store heat, each tank being connected to the tank/tanks which is/are immediately adjacent to the same by means of at least one end-pipe, and further characterized in that said tanks (S) are endowed with respective upper end-pipes (4) which connect the upper part of each tank (S) with the upper part of the adjacent tank, and with respective lower end-pipes (7) which connect the lower part of each tank (S) with the lower part of the adjacent tank.

2. Apparatus for storing heat according to claim 1, characterized in that during periods of no use, a thermosiphon-like circulation sets in between the tanks (S) as a result of the well known convective motions of the liquid; so that hotter water is stored within the tank placed in the highest position, the drawing of hot water for consumption occurring from said tank, while the temperature of the liquid in tanks placed at lower positions is gradually decreasing.

3. Apparatus for storing heat according to claim 2, characterized in that said circulation of hotter water which flows upward from each tank into the upper adjacent tank occurs through the pipes (4) for the rising flow which are arranged at the ends of the tanks (S), while the circulation of colder water which flows down from each tank (S) toward the lower adjacent tank occurs through the pipes (7) for the descending flow, said pipes being arranged at the opposite ends of tanks (S).

4. Apparatus for storing heat according to claim 3, characterized in that an automatic closure valve (6) is provided at the lower end of each one of the end-pipes or descending-flow pipes (7), said valve being controlled by the pressure differences that arise between the tanks (S) during hot water consumption; so as to obtain the result that hot water circulation between tanks (S) during consumption always occurs from the hottest zone of each tank toward the tank immediately above, and that cold water does not flow up the lower pipes (7) of each tank toward the upper levels, said lower pipes being necessary for thermosiphon-like circulation of colder water toward tanks in the lower positions.

5. Apparatus for storing heat according to claim 1, characterized in that the upper zones of the adjacent tanks (S) are connected to each other through pipes (35), by means of which pipes hotter water flows up from the lower tanks toward the tank placed at the highest position and connected with users; so as to prevent hotter water of the upper tanks from supplying heat to water contained in lower tanks.

6. Apparatus for storing heat according to claim 1, characterized in that each one of tanks (S) is connected to the adjacent tank through a first and a second pipe which are of different sizes (43,45), and are suitable to allow a thermosiphon-like circulation to set in, said pipes being so arranged that the upper zone of each tank (S) is connected to the upper zone of the tank which is immediately above, by means of the first pipe (43) which features a larger cross-section, and further the upper zone of each tank is also connected to the lower zone of the immediately upper tank through the second pipe (45) which is of smaller cross-section; so as to obtain that the hot water flow direction inside the first pipes (43) for the upward flow always is in the same sense both during the thermosiphon-like circulation and during water drawing periods, whereas the direction of water flow inside said pipes (45) is downwards (the colder water) during the thermosiphon-like circulation, and it is upwards (the hotter water) during water consumption.

7. Apparatus for storing heat according to claim 1, characterized in that each one of tanks (S) is connected to the adjacent tank through a first and a second pipe (43, 45) which connect respectively the upper zone of each tank with the upper zone of the tank immediately above the same, and the lower zone of the latter with the lower zone of the immediately underlying tank; said first pipes (43), which connect the upper zones of the adjacent tanks (S), featuring a cross-section much larger than that of said second pipes (55) which connect the lower zones of the same tanks, so that an almost absolute absence of vortices and mixing is attained, both during hot water consumption and during the thermosiphon-like circulation in the absence of water consumption.

8. Apparatus for storing heat according to claim 1, characterized in that the tank in the highest position has an upper pipe for how water outlet (5) toward users, while the tank placed in the lowest position has a lower inlet pipe (1) for cold water from the water main.

9. Apparatus for storing heat according claim 7, characterized in that the cross-section of the pipe (1) for the inlet of water from the water main in the lowest tank and the cross-section of the pipe (5) for the outlet of hot water from the tank placed in the highest position are slightly larger than the cross-sections of the second pipes (55) that connect the lower zones of the tanks (S).

10. Apparatus for storing heat according to claim 8, characterized in that the cross-section of the pipe (1) for the inlet of water from the water main in the lowest tank and the cross-section of the pipe (5) for the outlet of hot water from the tank placed in the highest position are slightly larger than the cross-sections of the second pipes (55) that connect the lower zones of the tanks (S).

11. Apparatus for storing heat according to claim 9, characterized in that the cross-section of the pipe (43) that connects the upper zones of the tanks (S) also is much larger than the cross-sections of the inlet pipes (1) for water from the water main and of the outlet pipe (5) for hot water.

12. Apparatus for storing heat according to claim 10, characterized in that the cross-section of the pipe (43) that connects the upper zones of the tanks (S) also is much larger than the cross-sections of the inlet pipes (1) for water from the water main and of the outlet pipe (5) for hot water.

13. Apparatus for storing heat according claim 1, characterized in that the liquid contained within the tanks (S) is made up of water or of a mixture of water and antifreeze compounds as well as of compounds against corrosion of metal parts, said liquid acting as a thermal storage for delayed use of hot water, and also characterized in that the tank placed at the highest position is supplied with a heat exchanger of suitable size, into which water from the water main flows for being heated before being exploited as hot water by users; so that, as a result, the thermosiphon-like circulation that sets in between each one of the tanks (S) and the adjacent tank/tanks is not stopped during hot water consumption and hence the presence of the liquid mixture in the upper tank at the maximum possible temperature is always warranted.

14. Apparatus for storing heat according claim 1, characterized in that the liquid contained within the tanks (S) is made up of water or of a mixture of water and antifreeze compounds as well as of compounds against corrosion of metal parts, said liquid acting as a thermal storage for delayed use of hot water, and also characterized in that the tank placed at the highest position is supplied with a heat exchanger of suitable size, into which water from the water main flows for being heated before being exploited as hot water by users; so that, as a result, the thermosiphon-like circulation that sets in between each one of the tanks (S) and the adjacent tank/tanks is not stopped during hot water consumption and hence the presence of the liquid mixture in the upper tank at the maximum possible temperature is always warranted.

* * * * *

UNITED STATES PATENT AND TRADEMARK OFFICE
CERTIFICATE OF CORRECTION

PATENT NO.    : 6,648,236 B2
DATED         : November 18, 2003
INVENTOR(S)   : Vittorio Tacchi It is certified that error appears in the above-identified patent and that said Letters Patent is hereby corrected as shown below:

Title page,
Item [30], Foreign Application Priority Data, should read as follows:
-- Sept. 4, 2001    (IT)........PT2001A0010
   Jun. 26, 2020    (IT)........PT2002A0014
   Jul. 24, 2002    (IT)........PT2002A0015 --.

Column 8, line 58 - Column 10, line 31,
Replace claims 7-14 with the following claims:

7. Apparatus for storing heat, said apparatus being characterized in that it comprises two or more superposed tanks (S) featuring a substanially horizontally developed geometric shape and containing water or a liquid suitable to store heat and further characterized in that each one of tanks (S) is connected to the adjacent tank through a first and a second pipe which are of different sizes (43,45), and are suitable to allow a thermosiphon-like circulation to set in, said pipes being so arranged that the upper zone of each tank (S) is connected to the upper zone of the tank which is immediately above, by means of the first pipe (43) which features a larger cross-section, and further the upper zone of each tank is also connected to the lower zone of the immediately upper tank through the second pipe (45) which is of smaller cross-section; so as to obtain that the hot water flow direction inside the first pipes (43) for the upward flow always is in the same sense both during the thermosiphon-like circulation and during water drawing periods, whereas the direction of water flow inside said pipes (45) is downwards (the colder water) during the thermosiphon-like circulation, and it is upwards (the hotter water) during water consumption.

8. Apparatus for storing heat according to claim 2, characterized in that each one of tanks (S) is connected to the adjacent tank through a first and a second pipe (43, 45) which connect respectively the upper zone of each tank with the upper zone of the tank immediately above the same, and the lower zone of the latter with the lower zone of the immediately underlying tank; said first pipes (43), which connect the upper zones of the adjacent tanks (S), featuring a cross-section much larger than that of said second pipes (55) which connect the lower zones of the same tanks, so that an almost absolute absence of vortices and mixing is attained, both during hot water consumption and during the thermosiphon-like circulation in the absence of water consumption.

9. Apparatus for storing heat according to claim 2, characterized in that the tank in the highest position has an upper pipe for how water outlet (5) toward users, while the tank placed in the lowest position has a lower inlet pipe (1) for cold water from the water main.

10. Apparatus for storing heat according claim 8, characterized in that the cross-section of the pipe (1) for the inlet of water from the water main in the lowest tank and the cross-section of the pipe (5) for the outlet of hot water from the tank placed in the highest position are slightly larger that the cross-sections of the second pipes (55) that connect the lower zones of the tanks (S).

UNITED STATES PATENT AND TRADEMARK OFFICE
CERTIFICATE OF CORRECTION

PATENT NO.      : 6,648,236 B2
DATED           : November 18, 2003
INVENTOR(S)     : Vittorio Tacchi It is certified that error appears in the above-identified patent and that said Letters Patent is hereby corrected as shown below:

<u>Column 8, line 58 - Column 10, line 31 (cont'd),</u>

11. Apparatus for storing heat according claim 9, characterized in that the cross-section of the pipe (1) for the inlet of water from the water main in the lowest tank and the cross-section of the pipe (5) for the outlet of hot water from the tank placed in the highest position are slightly larger than the cross-sections of the second pipes (55) that connect the lower zones of the tanks (S).

12. Apparatus for storing heat according to claim 10, characterized in that the cross-section of the pipe (43) that connects the upper zones of the tanks (S) also is much larger than the cross-sections of the inlet pipes (1) for water from the water main and of the outlet pipe (5) for hot water 13. Apparatus for storing heat according to claim 11, characterized in that the cross-section of the pipe (43) that connects the upper zones of the tanks (S) also is much larger than the cross-sections of the inlet pipes (1) for water from the water main and of the outlet pipe (5) for hot water.

14. Apparatus for storing heat according claim 2, characterized in that the liquid contained within the tanks (S) is made up of water or of a mixture of water and antifreeze compounds as well as of compounds against corrosion of metal parts, said liquid acting as a thermal storage for delayed use of hot water, and also characterized in that the tank placed at the highest position is supplied with a heat exchanger of suitable size, into which water from the water main flows for being heated before being exploited as hot water by users; so that, as a result, the thermosiphon-like circulation that sets in between each one of the tanks (S) and the adjacent tank/tanks is not stopped during hot water consumption and hence the presence of the liquid mixture in the upper tank at the maximum possible temperature is always warranted.

Signed and Sealed this

Fifteenth Day of November, 2005

JON W. DUDAS
*Director of the United States Patent and Trademark Office*